United States Patent
Takahashi et al.

(10) Patent No.: US 10,424,457 B2
(45) Date of Patent: Sep. 24, 2019

(54) FIELD EMISSION DEVICE AND REFORMING TREATMENT METHOD

(71) Applicant: MEIDENSHA CORPORATION, Tokyo (JP)

(72) Inventors: Daizo Takahashi, Numazu (JP); Michihiro Hatanaka, San Jose, CA (US)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/311,985

(22) PCT Filed: Mar. 16, 2017

(86) PCT No.: PCT/JP2017/010550
§ 371 (c)(1),
(2) Date: Dec. 20, 2018

(87) PCT Pub. No.: WO2017/221478
PCT Pub. Date: Dec. 28, 2017

(65) Prior Publication Data
US 2019/0214215 A1    Jul. 11, 2019

(30) Foreign Application Priority Data

Jun. 23, 2016   (JP) .................................. 2016-124149

(51) Int. Cl.
*H01J 35/06* (2006.01)
*H01J 1/304* (2006.01)
*H01J 9/50* (2006.01)

(52) U.S. Cl.
CPC ............ *H01J 35/065* (2013.01); *H01J 1/304* (2013.01); *H01J 9/50* (2013.01);
(Continued)

(58) Field of Classification Search
CPC .......... H01J 35/04; H01J 35/045; H01J 35/06; H01J 35/064; H01J 35/065; H01J 35/066; H01J 2235/06; H01J 2235/064
See application file for complete search history.

(56) References Cited

U.S. PATENT DOCUMENTS

| | | | |
|---|---|---|---|
| 3,303,372 A | * | 2/1967 | Gager ..................... H01J 35/14 313/148 |
| 4,679,219 A | | 7/1987 | Ozaki |

(Continued)

FOREIGN PATENT DOCUMENTS

| | | |
|---|---|---|
| JP | 54-093375 U1 | 7/1979 |
| JP | 61-62344 U | 4/1986 |

(Continued)

OTHER PUBLICATIONS

U.S. Appl. No. 16/309,238, filed Dec. 12, 2018, Meidensha Corporation.
(Continued)

*Primary Examiner* — Thomas R Artman
(74) *Attorney, Agent, or Firm* — Foley & Lardner LLP (57) ABSTRACT

Emitter (3) and target (7) are arranged so as to face each other in vacuum chamber (1), and guard electrode (5) is provided at outer circumferential side of electron generating portion (31) of emitter (3). Emitter (3) is supported movably in both end directions of vacuum chamber (1) by emitter supporting unit (4) having movable body (40). To perform regeneration process of guard electrode (5), emitter is moved to no-discharge position by operating emitter supporting unit, and state in which field emission of electron generating portion (31) is suppressed is set, then by applying voltage across guard electrode (5), discharge is repeated. After regeneration process, by operating emitter supporting unit again, emitter is moved to discharge position, and state in which field emission of electron generating portion (31) is (Continued)

possible is set with movement of movable body (40) toward the other and side being restrained by movement restraining unit (6).

10 Claims, 3 Drawing Sheets

(52) U.S. Cl.
CPC ............... *H01J 2201/30453* (2013.01); *H01J 2235/062* (2013.01); *H01J 2235/064* (2013.01)

(56) References Cited

U.S. PATENT DOCUMENTS

| | | | | |
|---|---|---|---|---|
| 7,085,351 | B2* | 8/2006 | Lu .................. | A61B 6/4488 |
| | | | | 315/169.3 |
| 7,965,818 | B2* | 6/2011 | Jaafar ................ | H01J 35/32 |
| | | | | 378/121 |
| 8,005,191 | B2* | 8/2011 | Jaafar ................ | H01J 35/32 |
| | | | | 378/122 |
| 8,378,561 | B2 | 2/2013 | Ishiguro et al. | |
| 8,913,719 | B2* | 12/2014 | Kuribayashi .......... | H01J 1/88 |
| | | | | 378/134 |
| 10,068,741 | B2 | 9/2018 | Takahashi et al. | |
| 2004/0028183 | A1* | 2/2004 | Lu .................. | A61B 6/4488 |
| | | | | 378/109 |
| 2006/0274889 | A1* | 12/2006 | Lu .................. | A61B 6/4488 |
| | | | | 378/122 |
| 2010/0002840 | A1* | 1/2010 | Jaafar .................. | H01J 35/065 |
| | | | | 378/122 |
| 2011/0305314 | A1 | 12/2011 | Kitamura et al. | |
| 2012/0194057 | A1 | 8/2012 | Suzuki et al. | |
| 2013/0259197 | A1* | 10/2013 | Kuribayashi .......... | H01J 1/88 |
| | | | | 378/64 |

FOREIGN PATENT DOCUMENTS

| | | |
|---|---|---|
| JP | 3-156846 A | 7/1991 |
| JP | 2008-150253 A | 7/2008 |
| JP | 2008-311174 A | 12/2008 |
| JP | 2011-8998 A | 1/2011 |
| JP | 2011-119084 | 6/2011 |
| JP | 2011-258470 A | 12/2011 |
| JP | 2013-225490 A | 10/2013 |
| KR | 10-2016-0058582 A | 5/2016 |
| WO | WO 03/080180 A1 | 10/2003 |
| WO | WO 2010/013772 A1 | 2/2010 |
| WO | WO 2016/104484 A1 | 6/2016 |

OTHER PUBLICATIONS

U.S. Appl. No. 16/312,565, filed Dec. 21, 2018, Meidensha Corporation.
Japanese Office Action and English translation, dated May 15, 2017, 9 pages.
Korean Office Action and English translation, Application No. 10-2019-7001913, dated Feb. 25, 2019, 7 pages.
Korean Office Action and English translation, Application No. 10-2019-7000030, dated Feb. 15, 2019, 7 pages.
Japanese Office Action and English translation, dated May 16, 2017, 9 pages.

* cited by examiner

FIELD EMISSION DEVICE AND REFORMING TREATMENT METHOD

TECHNICAL FIELD

The present invention relates to a field emission device (an electric field radiation device) and a reforming treatment method (a regeneration processing method) that are applied to various devices such as an X-ray apparatus, an electron tube and a lighting system.

BACKGROUND ART

As an example of the electric field radiation device applied to various devices such as the X-ray apparatus, the electron tube and the lighting system, there has been known a configuration in which voltage is applied between an emitter (an electron source formed of carbon etc.) and a target which are positioned (which are separated at a predetermined distance) while facing to each other in a vacuum chamber of a vacuum enclosure, an electron beam is emitted by field emission (by generation of electrons and emission of the electrons) of the emitter, and by colliding the emitted electron beam with the target, a desired function (for instance, in the case of the X-ray apparatus, a radioscopy resolution by external emission of X-ray) is obtained.

Further, suppression of dispersion of the electron beam emitted from the emitter, for instance, by employing a triode structure formed with a grid electrode interposed between the emitter and the target, and/or by shaping a surface of an electron generating portion (a portion that is positioned at an opposite side to the target and generates electrons) of the emitter into a curved surface, and/or by arranging a guard electrode, which is at the same potential as the emitter, at an outer circumferential side of the emitter, has been discussed (e.g. Patent Documents 1 and 2).

It is desirable that the electron beam be emitted by generating the electrons from only the electron generating portion of the emitter by the above application of voltage. However, if an undesired minute protrusion or dirt etc. exists in the vacuum chamber, an unintentional flashover phenomenon easily occurs, and a withstand voltage performance cannot be obtained, then a desired function may not be able to be obtained.

This is, for instance, a case where a portion at which a local electric field concentration easily occurs (e.g. a minute protrusion formed during working process) is formed at the guard electrode etc. (the target, the grid electrode and the guard electrode, hereinafter simply called the guard electrode etc., as necessary), a case where the guard electrode etc. adsorb gas component (e.g. a residual gas component in the vacuum enclosure) and a case where an element causing the electron to be easily generated is contained in materials applied to the guard electrode etc. In these cases, the electron generating portion is formed also at the guard electrode etc., and a quantity of generation of the electron becomes unstable, then the electron beam easily disperses. For instance, in the case of the X-ray apparatus, there is a risk that X-ray will be out of focus.

Therefore, as a method of suppressing the flashover phenomenon (as a method of stabilizing the quantity of generation of the electron), for instance, a method of performing a voltage discharge conditioning process (regeneration (reforming); hereinafter simply called a regeneration process, as necessary) that applies voltage (high voltage) across the guard electrode etc. (e.g. between the guard electrode and the grid electrode) and repeats discharge, has been studied.

CITATION LIST

Patent Document

Patent Document 1: Japanese Unexamined Patent Application Publication No. 2008-150253
Patent Document 2: Japanese Unexamined Patent Application Publication No. 2011-008998

SUMMARY OF THE INVENTION

However, when the voltage of the regeneration process is merely applied across the guard electrode etc., field emission (e.g. field emission before performing the regeneration process) of the emitter also easily occurs, then there is a risk that the guard electrode etc. will not properly undergo the regeneration process.

The present invention was made in view of the above technical problem. An object of the present invention is therefore to provide a technique that is capable of performing the regeneration process of the guard electrode etc. while suppressing the field emission of the emitter and contributing to an improvement in characteristics of the electric field radiation device.

The electric field radiation device and the regeneration processing method according to the present invention are those that can solve the above problem. As one aspect of the electric field radiation device, an electric field radiation device comprises: a vacuum enclosure formed by sealing both end sides of a tubular insulator and having a vacuum chamber at an inner wall side of the insulator; an emitter positioned at one end side of the vacuum chamber and having an electron generating portion that faces to the other end side of the vacuum chamber; a guard electrode arranged at an outer circumferential side of the electron generating portion of the emitter; a target positioned at the other and side of the vacuum chamber and provided so as to face to the electron generating portion of the emitter; a movable emitter supporting unit having a movable body that is movable in both end directions of the vacuum chamber and supporting the emitter movably in the both end directions of the vacuum chamber through the movable body; and a movement restraining unit restraining a movement toward the other end side of the both ends directions of the movable body, and the emitter supporting unit is configured to change a distance between the electron generating portion of the emitter and the target by movement of the emitter supporting unit, and field emission is performed by the electron generating portion of the emitter with the movement of the movable body toward the other end side of the vacuum chamber being restrained by the movement restraining unit.

The movement restraining unit has: a protrusion that protrudes from an outer circumferential side of the movable body outwards in a crossing direction of the vacuum chamber; and a crossing portion provided at a position of the other end side of the vacuum chamber with respect to the protrusion and crossing the protrusion in the both end directions. And, the movement restraining unit is configured to restrain the movement of the movable body toward the other end side of the vacuum chamber by contact of the protrusion with the crossing portion.

The guard electrode has a tubular shape that extends in the both and directions of the vacuum chamber, and one end of the guard electrode is retained by the vacuum enclosure, and the crossing portion protrudes from (a middle of) a tubular inner circumferential side of the guard electrode inwards in the crossing direction of the vacuum chamber.

Further, a distance between a target side of the guard electrode and the electron generating portion of the emitter becomes shortest in a state in which the movement of the movable body toward the other end side of the vacuum chamber is restrained by the movement restraining unit.

The guard electrode is provided, at the target side thereof, with a small diameter port ion. Or, the guard electrode is provided, at the target side thereof, with an edge portion that extends in the crossing direction of the vacuum chamber and overlaps with a circumferential edge portion of the electron generating portion of the emitter in the both end directions of the vacuum chamber.

The electric field radiation device further comprises: bellows that can expand and contract in the both end directions of the vacuum chamber. And, one end side of the bellows is retained by the emitter supporting unit, and the other end side of the bellows is retained by the vacuum enclosure. the movable body has a shape that extends in the both end directions of the vacuum chamber at an opposite aide to the electron generating portion of the emitter. Further, a grid electrode is provided between the emitter and the target in the vacuum chamber.

As one aspect of the regeneration processing method of the above electric field radiation device, a regeneration processing method comprises: applying voltage across the guard electrode in a state in which the electron generating portion of the emitter and the guard electrode are separate from each other by operation of the emitter supporting unit; and performing a regeneration process to at least the guard electrode in the vacuum chamber.

According to the present invention described above, it is possible to perform the regeneration process of the guard electrode etc. while suppressing the field emission of the emitter and contribute to an improvement in characteristics of the electric field radiation device.

EMBODIMENTS FOR CARRYING OUT THE INVENTION

An electric field radiation device according to an embodiment of the present invention is not an electric field radiation device merely having an emitter and a target which are positioned so as to face to each other and a guard electrode at an outer circumferential side of an electron generating portion of the emitter in a vacuum chamber formed by sealing both end sides of an insulator, but an electric field radiation device having a movable emitter supporting unit that supports the emitter movably in directions of both ends of the vacuum chamber (hereinafter, simply called both end directions) through a movable body that is movable in the both end directions and configured to be able to change a distance between the electron generating portion of the emitter and a target by movement of the emitter supporting unit. Further, the electric field radiation device according to the embodiment of the present invention has a movement restraining unit that restrains or limits a movement toward the other end side (i.e. the target side) of the both ends directions of the movable body, and is configured to allow field emission by the electron generating portion of the emitter in a state (hereinafter, simply called a movement restrained state) in which the movement of the movable body toward the other end side is restrained by the movement restraining unit.

As conventional regeneration processing method of the guard electrode etc., other than the method of applying high voltage across the guard electrode etc. as mentioned above, a method of removing adsorbed gas by exposing guard electrode etc. in a vacuum atmosphere has been known. This method is a method in which, for instance, an electric field radiation device (hereinafter, called a conventional device) is formed with a large diameter exhaust pipe being provided at a vacuum enclosure, and by bringing the vacuum chamber into a high temperature vacuum state through the large diameter exhaust pipe, the adsorbed gas of the guard electrode etc. in the vacuum chamber is released, and subsequently, the vacuum chamber is returned to an atmospheric state and the emitter etc. are arranged in the vacuum chamber through the large diameter exhaust pipe, then by sealing the vacuum chamber, the vacuum chamber is brought into the vacuum state again.

However, it is difficult to maintain the high temperature vacuum state of the vacuum chamber in the vacuum enclosure provided with the large diameter exhaust pipe for a long time. Further, there is a risk that gas will be re-adsorbed to the guard electrode etc. before the vacuum chamber is brought into the vacuum state again. Therefore, it is impossible to regenerate (smooth) a coarse surface formed at the guard electrode etc. In addition, the vacuum enclosure increases in size due to the large diameter exhaust pipe, also man-hour of manufacturing may increase and product cost may increase.

On the other hand, according to the configuration of the embodiment of the present invention, it is possible to perform the regeneration process of the guard electrode etc. without using the above-mentioned methods. To perform the regeneration process, by operating the emitter supporting unit and moving the emitter from a discharge position (a position at which the field emission is performed) to a no-discharge position (that is a discharge electric field or less) (i.e. moving the emitter in a direction in which a distance between the electron generating portion and the target becomes longer), a state in which the field emission of the emitter is suppressed (e.g. as shown in after-mentioned FIG. 2, a state in which the electron generating portion of the emitter and the guard electrode are separate from each other (a gap is formed between them)) is set. Then, in this state, by applying voltage across the guard electrode etc., the regeneration process can be performed, and surfaces of the guard electrode etc. melt or dissolve and are smoothed out. With this, a desired withstand voltage can be obtained. Further, in the state in which the field emission of the emitter is suppressed as described above, no load is applied to the emitter during the regeneration process.

Therefore, according to the regeneration process of the embodiment, even if the minute protrusion exists on the surfaces of the guard electrode etc., the surfaces can be smoothed. Further, in the case where gas component (e.g. the residual gas component in the vacuum enclosure) is adsorbed, the adsorbed gas is released. Moreover, in the case where the element causing the electron to be easily generated is contained in the guard electrode etc., by the above melt-smoothing, the element can be held or stored inside the guard electrode etc., and generation of the electrons, caused by the element, can be suppressed. Hence, the quantity of generation of the electron can be easily stabilized in the electric field radiation device.

After performing the regeneration process of the guard electrode etc. as described above, by operating the emitter supporting unit again and moving the emitter from the no-discharge position to the discharge position (i.e. moving the emitter in a direction in which the distance between the electron generating portion and the target becomes shorter) a state in which a distance between the electron generating portion of the emitter and the guard electrode is shortest (a state in which the electron generating portion of the emitter and the guard electrode are positioned close to each other or contact each other) is set. Then, the field emission of the emitter (the electron generating portion) can be possible, and a desired function of the electric field radiation device can be obtained (in the case of the X-ray apparatus, X-irradiation etc. can be obtained).

Further, when the emitter is positioned at the discharge position, movement of the movable body of the emitter supporting unit is restrained or limited by the movement restraining unit, that is, movement (toward the other end side) of the emitter supporting unit is restrained, and movement of the emitter is restrained so that the emitter does not move to the target side across the discharge position. Therefore, according to the present embodiment, by setting the discharge position of the emitter to a position at which the movement of the movable body is restrained, positioning of the emitter with respect to the discharge position (or the guard electrode) is facilitated when changing the distance between the electron generating portion of the emitter and the target by the operation of the emitter supporting unit.

Figure 4:
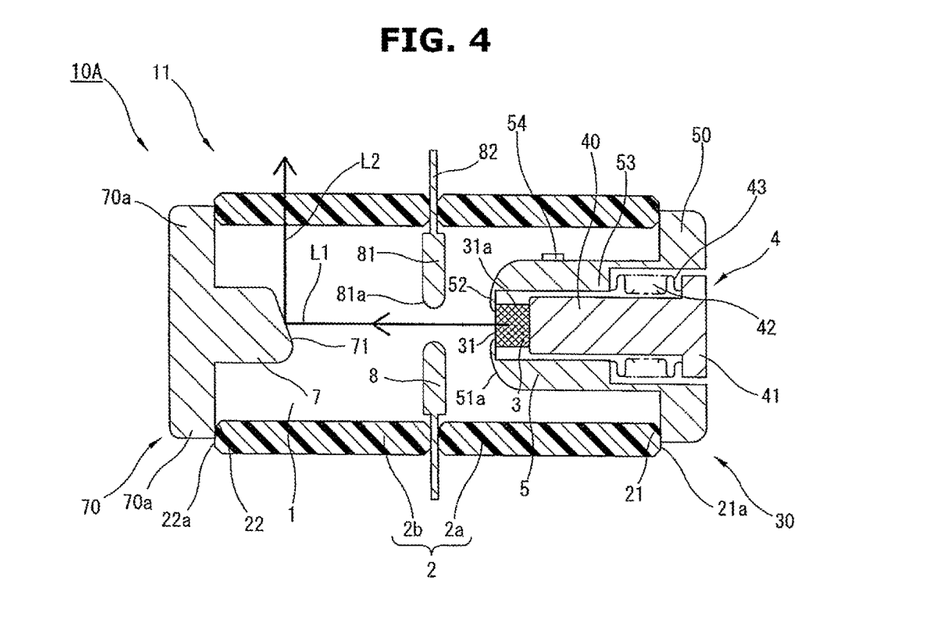
FIG. 4 is a schematic explanatory drawing showing an electric field radiation device not having a movement restraining portion 6 (a sectional view cut in both end directions of the vacuum chamber 1 (a discharge position)).
Figure 5:
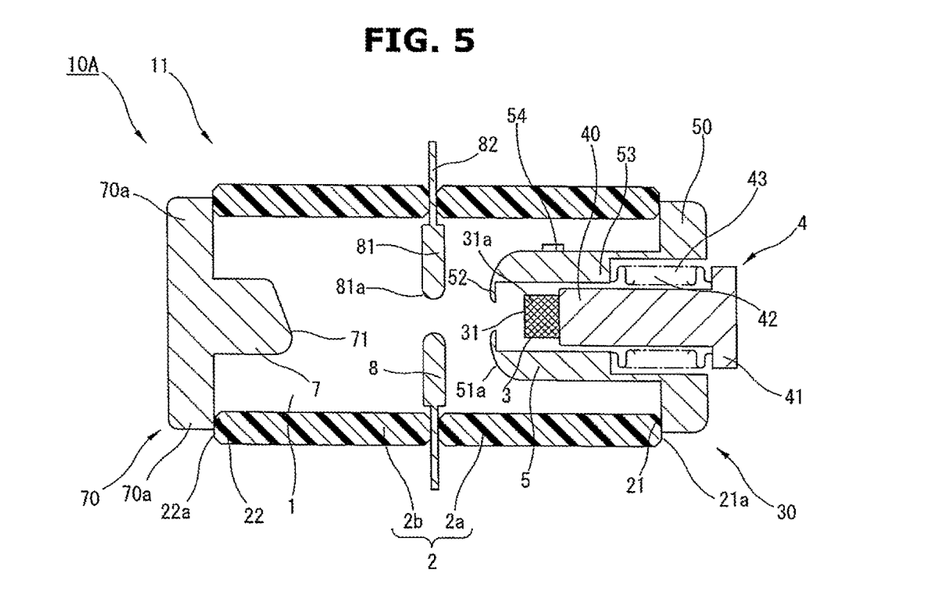
FIG. 5 is a schematic explanatory drawing showing the electric field radiation device not having the movement restraining portion 6 (a sectional view cut in both end directions of the vacuum chamber 1 (a no-discharge position)).

Here, when focusing attention on a device not having the above movement restraining unit, e.g. a device 10A as shown in FIGS. 4 and 5 merely having the emitter supporting unit 4 and configured so that an edge portion 52 that crosses or overlaps with a circumferential edge portion 31a of the electron generating portion 31 of the emitter 3 is formed, it is conceivable that when the emitter supporting unit 4 is operated and the emitter 3 moves to the discharge position and contacts the guard electrode 5 as shown in FIG. 4 (in FIG. 4, the emitter 3 contacts the guard electrode 5 with the edge portion 52 of the guard electrode 5 overlapping with the emitter 3), a vacuum pressure of the vacuum chamber 1 will be exerted to contact surfaces of the edge portion 52 and the emitter 3. If a contact pressure, due to this vacuum pressure, exerted to the contact surfaces becomes large, a stress is easily generated at the emitter 3 (the electron generating portion 31 etc.) and the guard electrode 5 (the edge portion 52 etc.). Then, shapes of these elements or portions could be deformed, or desired characteristics of the electric field radiation device may not be able to be maintained.

On the other hand, since the electric field radiation device (e.g. an after-mentioned X-ray apparatus 10) according to the present embodiment is configured to be able to set the discharge position of the emitter to the position at which the movement of the movable body is restrained as described above, even in the case where the emitter positioned at the discharge position contacts the guard electrode, the contact pressure can be lowered. It is therefore possible to prevent the deformation of the shapes of the emitter and the guard electrode etc., and to maintain the desired characteristics of the electric field radiation device.

The electric field radiation device of the present embodiment can be variously modified by properly applying common general technical knowledge of each technical field as long as the electric field radiation device has the emitter supporting unit supporting the emitter movably in the both end directions and the movement restraining unit restraining the movement of the movable body of the emitter supporting unit and is configured to be able to change the distance between the electron generating portion of the emitter and the target. Examples of the electric field radiation device will be explained below.

Embodiment 1 of Electric Field Radiation Device

Figure 1:
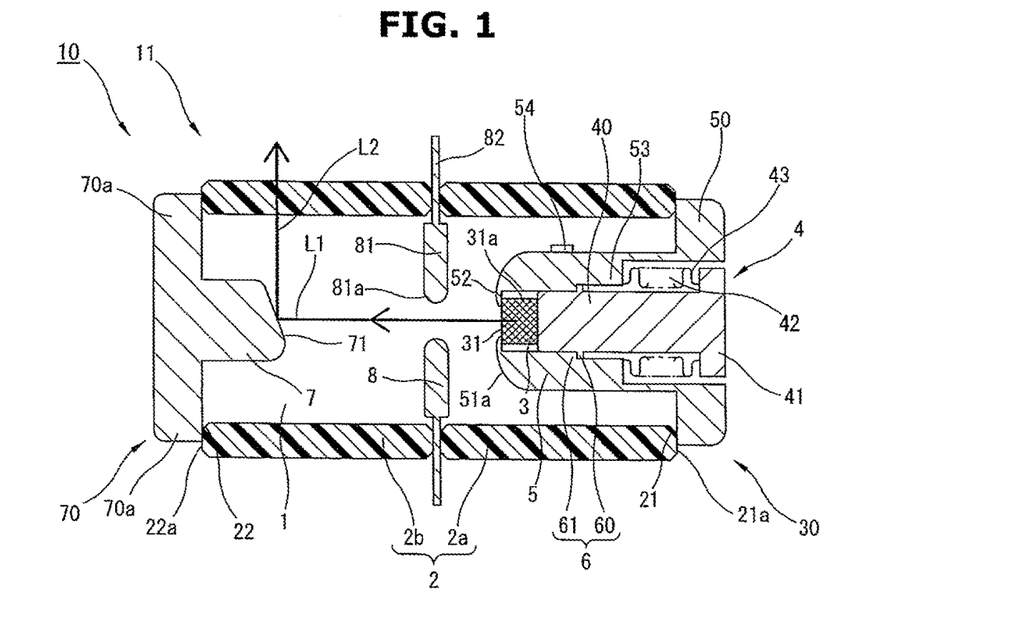
FIG. 1 is a schematic explanatory drawing showing an electric field radiation device according to an embodiment of the present invention (a sectional view cut in both end directions of a vacuum chamber 1 (a discharge position)).
Figure 2:
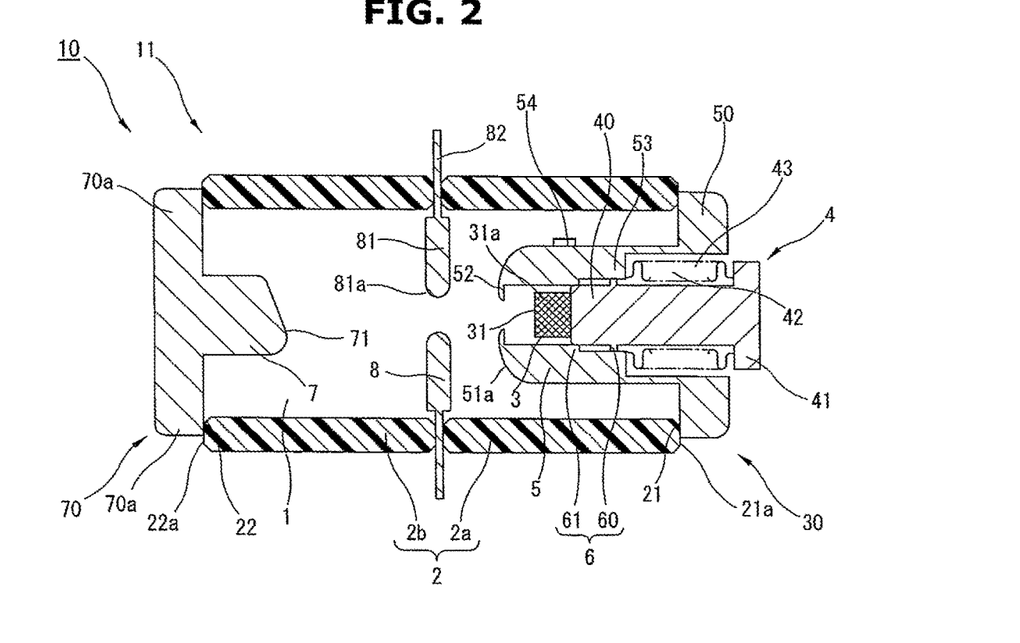
FIG. 2 is a schematic explanatory drawing showing the electric field radiation device according to the embodiment of the present invention (a sectional view cut in both end directions of the vacuum chamber 1 (a no-discharge position)).

A reference sign 10 in FIGS. 1 and 2 is an example of an X-ray apparatus to which the electric field radiation device of the present embodiment is applied. The same element or component as that of FIGS. 4 and 5 is denoted by the same reference sign, and its explanation will be omitted. In this X-ray apparatus 10, an opening 21 at one end side of a tubular insulator 2 and an opening 22 at the other end side are sealed with an emitter unit 30 and a target unit 70 respectively (e.g. by brazing), and a vacuum enclosure 11 having a vacuum chamber 1 at an inner wall side of the insulator 2 is defined. Between the emitter unit 30 (an after-mentioned emitter 3) and the target unit 70 (an after-mentioned target 7), a grid electrode 8 that extends in a crossing direction of the vacuum chamber 1 (a direction crossing the both end directions, hereinafter, simply called crossing direction) is provided.

The insulator 2 is formed of insulation material such as ceramic. As the insulator 2, various shapes or forms can be employed as long as they can isolate the emitter unit 30 (the emitter 3) and the target unit 70 (the target 7) from each other and form the vacuum chamber 1 inside them. For instance, as shown in the drawings, it is a configuration in which the grid electrode 8 (e.g. a lead terminal 82) is interposed between concentrically-arranged two tubular insulation members 2a and 2b and the both insulation members 2a and 2b are fixed together by brazing etc.

The emitter unit 30 has the emitter 3 having, at a portion facing to the target unit 70 (the target 7), an electron generating portion 31, a movable emitter supporting unit 4 having a movable body 40 that is movable in the both end directions and supporting the emitter 3 movably in the both end and directions of the vacuum chamber 1 through the movable body 40, a guard electrode 5 arranged at an outer circumferential side of the electron generating portion 31 of the emitter 3 and a movement restraining unit 6 restraining or limiting a movement toward the other end side (i.e. the target 7 side) of the both ends directions of the movable body 40.

As the emitter 3, various shapes or forms can be employed as long as they have the electron generating portion 31 as described above and electrons are generated from the electron generating portion 31 by application of voltage and also as shown in the drawings they can emit an electron beam L1 (as a radiator or an emitter). For instance, it is made of material of carbon etc. (carbon nanotube etc.), and as shown in the drawings, a solid emitter or a thin-film emitter formed by evaporation is used as the emitter 3. As the electron generating portion 31, it is preferable to shape a surface, facing to the target unit 70 (the target 7), of the electron generating portion 31 into a concave shape (a curved shape) in order for the electron beam L1 to easily converge.

As the emitter supporting unit 4, various shapes or forms can be employed as long as they have the movable body 40 that is movable in the both end directions and can support the emitter 3 movably in the both end direct ions through the movable body 40 as described above. For instance, it is a configuration having the columnar movable body 40, which extends in the both end directions at an inner side of the guard electrode 5 and has at one end side thereof (i.e. at the opening 21 side) a flange portion 41 and supports the emitter 3 at the other end side (i.e. at the opening 22 side) (for instance, an opposite side to the electron generating portion 31 of the emitter 3 is fixed to the other end side of the movable body 40 by crimping, swaging or welding and so on), and bellows 42 which can expand and contract in the both and directions and are retained by the vacuum enclosure 11 (for instance, as shown in the drawings, the bellows 42 are retained by the insulator 2 through the guard electrode 5). Further, as the movable body 40, the movable body 40 could have a structure in which a protrusion 60 as a part of element forming the movement restraining unit 6 protrudes from an outer circumferential side of the movable body 40 outwards in the crossing direction.

The emitter supporting unit 4 provided with the movable body 40 and the bellows 42 as described above moves in the both and directions by the expansion and contraction of the bellows 42, and consequently, the emitter 3 also moves in the both end directions. The emitter supporting unit 4 can be formed of various material, and material is not especially limited. For instance, the emitter supporting unit 4 could be formed of conductive metal material such as stainless (SUS material etc.) and copper.

As the bellows 42, various shapes or forms can be employed as long as they can expand and contract in the both end directions. For instance, the bellows could be molded by working of metal material such as metal sheet or metal plate. As an example, as shown in the drawings, the bellows 42 have a bellow tubular wall 43 that extends in the both end directions so as to surround or cover an outer circumferential side of the movable body 40.

As a retaining structure of the bellows 42 in the drawings, one and side of the bellows 42 is fixed to the flange portion 41 of the movable body 40 by brazing etc., and the other end side of the bellows 42 is fixed to the inner side of the guard electrode 5 (in the drawings, the other end side of the bellows 42 is fixed to an after-mentioned stepped portion 53) by brazing etc. Then, the bellows 42 define the vacuum chamber 1 and the atmospheric side (the outer peripheral side of the vacuum enclosure 11), and can maintain air tightness of the vacuum chamber 1. However, fixing manner etc. of the bellows 42 are not limited to the above configuration. That is, as long as the one end side of the bellows 42 is retained by the emitter supporting unit 4 (e.g. by the movable body 40 or the flange portion 41) and the other end side of the bellows 42 is retained by the vacuum enclosure 11 (e.g. by the inner side of the guard electrode 5 or an after-mentioned flange portion 50) and also the bellows 42 can expand and contract in the both end directions as described above and can define the vacuum chamber 1 and the atmospheric side (the outer peripheral side of the vacuum enclosure 11) and also can maintain the air tightness of the vacuum chamber 1, various shapes or forms can be employed.

As the guard electrode 5, as long as the guard electrode 5 is arranged at the outer circumferential side of the electron generating portion 31 of the emitter 3 as described above and the electron generating portion 31 of the emitter 3 moved by and according to the movement of the emitter supporting unit 4 contacts and separates from the guard electrode 5 then, in a state in which the distance between the emitter 3 and the guard electrode 5 is shortest (the state in which the emitter 3 and the guard electrode 5 are positioned close to each other or contact each other, as shown in FIG. 1), the guard electrode 5 can suppress dispersion of the electron beam L1 emitted from the emitter 3, various shapes or forms can be employed.

As an example of the guard electrode 5, the guard electrode 5 is made of material of stainless (SUB material etc.), and has a tubular shape that extends in the both end directions of the vacuum chamber 1 at an outer circumferential aide of the emitter 3. And, one end side of the guard electrode 5 is retained by an and surface 21a of the opening 21 of the insulator 2 through the flange portion 50 formed at the one end side in the both end directions of the guard electrode 5, and the other and side (i.e. the target 7 side) of the guard electrode 5 contacts and separates from the emitter 3.

Figure 3:
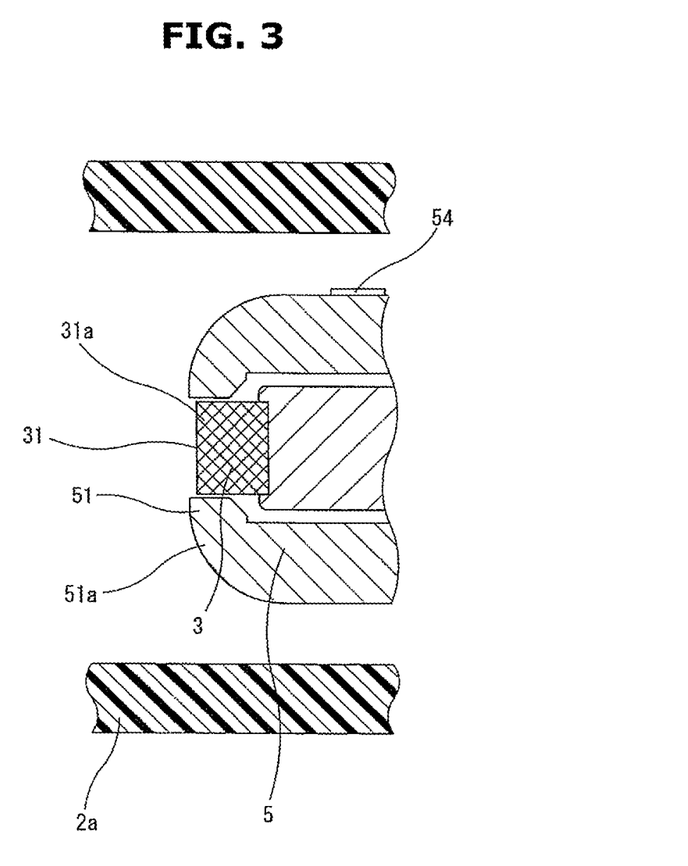
FIG. 3 is a schematic explanatory drawing showing an example of a guard electrode 5 of the electric field radiation device of the embodiment (an enlarged view of a part of FIG. 1, where the guard electrode 5 has a small diameter portion 51 instead of an edge portion 52).

This configuration of the guard electrode 5 to contact and separate from the emitter 3 is not especially limited. For instance, as shown in FIG. 3, a configuration in which a small diameter portion 51 is formed at the other end side in the both and directions of the guard electrode 5 is conceivable. However, the configuration as shown in FIGS. 1 and 2, in which the edge portion 52 that extends inwards in the crossing direction of the vacuum chamber 1 and crosses or overlaps with the circumferential edge portion 31a of the electron generating portion 31 of the emitter 3 in the both end directions of the vacuum chamber 1 is formed, is raised. Further, both of the small diameter portion 51 and the edge portion 52 could be formed.

In such a contacting and separating configuration of the guard electrode 5, by the movement of the emitter supporting unit 4, the emitter 3 moves in the both end directions at the inner side (a tubular inner wall side) of the guard electrode 5, and the electron generating portion 31 of the emitter 3 contacts and separates from the small diameter portion 51 or the edge portion 52. Further, in the configuration in which the guard electrode 5 has the edge portion 52, when the emitter 3 is positioned close to or contacts the guard electrode 5, the circumferential edge portion 31a of the electron generating portion 31 is covered with and protected by the edge portion 52.

In the drawings, the guard electrode 5 has at the inner side thereof a shape whose diameter is reduced stepwise from one end side to the other end side of the guard electrode 5, and a stepped portion 53 is formed inside the guard electrode 5. Fixing the other end side of the bellows 42 to the stepped portion 53 facilitates a fixing work, and also a fixing structure is stable. In the drawings, other than the stepped portion 53, a crossing portion 61 as a part of element forming the movement restraining unit 6 is formed inside the guard electrode 5 so as to protrude from the inner side of the guard electrode 5 inwards in the crossing direction (so as to cross or overlap with the protrusion 60).

By the shape, like the guard electrode 5, whose diameter is reduced stepwise from the one end side to the other end side, the electron generating portion 31 of the emitter 3 moves inside the guard electrode 5 while being guided toward the small diameter portion 51 or the edge portion 52. Further, by the configuration of the guard electrode 5 as shown in the drawings, the bellows 42 are accommodated inside the guard electrode 5, and a physical shock from an outer peripheral side of the vacuum enclosure 11 to the bellows 42 can be suppressed (the bellows 42 can be protected and damage to the bellows 42 can be prevented). Moreover, this configuration contributes to size reduction of the X-ray apparatus 10.

Further, it is possible to employ such a shape as to suppress a local electric field concentration which could occur at the electron generating portion 31 (especially, at the circumferential edge portion 31a) and/or suppress the flashover occurring from the electron generating portion 31 to other portions, by enlarging an apparent radius of curvature of the circumferential edge portion 31a of the electron generating portion 31 of the emitter 3. For instance, as shown in the drawings, the guard electrode 5 has a shape having a curved surface port ion 51a at the other end side in the both end direct ions.

Here, in the case of the guard electrode 5 shown in the drawings, although a getter 54 is fixed to an outer circumferential side of the guard electrode 5 by welding, a fixing position and material of the getter 54 are not especially limited.

As the movement restraining unit 6, various shapes or forms can be employed as long as they can restrain the movement toward the other end side of the both end directions of the movable body 40 as described above and set the position at which the movement of the movable body 40 is restrained to the discharge position of the emitter.

As an example of the configuration of the movement restraining unit 6 formed inside the vacuum chamber 1, the movement restraining unit 6 has the flange-shaped protrusion 60 formed at the outer circumferential side of the movable body 40 (in the drawings, between the emitter 3 and the flange portion 41) and protruding from the outer circumferential side of the movable body 40 outwards in the crossing direction and the stepped crossing portion 61 formed at a tubular inner circumferential side of the guard electrode 5 (in the drawings, between the edge portion 52 and the stepped portion 53) and protruding from the tubular inner circumferential side of the guard electrode 5 inwards in the crossing direction. And further, the crossing portion 61 is formed at a position of the other and side of the vacuum chamber 1 with respect to the protrusion 60, and crosses or overlaps with the protrusion 60 in the both end directions. However, the movement restraining unit 6 is not limited to this configuration.

For instance, the movement restraining unit 6 is provided outside the vacuum chamber 1 so that the protrusion 60 is formed at an outer circumferential side of the flange portion 41 so as to protrude from the outer circumferential side of the flange portion 41 outwards in the crossing direction, and the crossing portion 61 is formed at an inner side of the flange portion 50 (at the other end side of the vacuum chamber 1 with respect to the protrusion 60) so as to protrude from the inner side of the flange portion 50 inwards in the crossing direction (drawing of this configuration is omitted), as long as these protrusion 60 and crossing portion 61 cross and contact each other and the movement of the movable body 40 is restrained then this movement restrained position can be set to the discharge position of the emitter 3.

In order to achieve the configuration in which the emitter 3 is set at the discharge position when the protrusion 60 and the crossing portion 61 contact each other, positions at which the protrusion 60 and the crossing portion 61 are formed are properly set. For instance, in the case of the protrusion 60 and the crossing portion 61 shown in the drawings, the positions at which the protrusion 60 and the crossing portion 61 are formed are properly set so that a distance in the both and directions between the protrusion 60 and the electron generating portion 31 of the emitter 3 is equal to or less than a distance in the both end directions between the crossing portion 61 and the edge portion 52.

Next, the target unit 70 has the target 7 facing to the electron generating portion 31 of the emitter 3 and a flange portion 70a supported by an and surface 22a of the opening 22 of the insulator 2.

As the target 7, various shapes or forms can be employed as long as the electron beam L1 emitted from the electron generating portion 31 of the emitter 3 collides and as shown in the drawings an X-ray L2 can be emitted. In the drawings, the target 7 has, at a portion facing to the electron generating portion 31 of the emitter 3, an inclined surface 71 that extends in an intersecting direction that inclines at a predetermined angle with respect to the electron beam L1. By the fact that the electron beam L1 collides with this inclined surface 71, the X-ray L2 is emitted in a direction (e.g. in the crossing direction of the vacuum chamber 1 as shown in the drawings) that is bent from an irradiation direction of the electron beam L1.

As the grid electrode 8, various shapes or forms can be employed as long as they are interposed between the emitter 3 and the target 7 as described above and they can properly control the electron beam L1 that passes thorough them. For instance, as shown in the drawings, the grid electrode 8 has an electrode portion (e.g. a mesh electrode portion) 81 extending in the crossing direction of the vacuum chamber 1 and having a passing hole 81a thorough which the electron beam L1 passes and the lead terminal 82 penetrating the insulator 2 (in the crossing direction of the vacuum chamber 1).

According to the X-ray apparatus 10 configured as described above, by properly operating the emitter supporting unit 4, it is possible to change the distance between the electron generating portion 31 of the emitter 3 and the target 7. For instance, am shown in FIG. 2, in a state in which the electron generating portion 31 is moved from the discharge position to the no-discharge position and the field emission of the emitter 3 is suppressed, a desired regeneration process for the guard electrode 5, the target 7, the grid electrode 8 etc. can be performed. Further, as compared with the abovementioned conventional device provided with the large diameter exhaust pipe, size reduction can be readily achieved, and also reduction in man-hour of manufacturing and reduction in product cost can be realized.

<<An Example of Regeneration Process for Guard Electrode Etc. of X-Ray Apparatus 10>>

When performing the regeneration process for the guard electrode 5 etc. of the X-ray apparatus 10, first, by operating the emitter supporting unit 4, the emitter 3 is moved to the opening 21 side (to the no-discharge position) as shown in FIG. 2, and the state in which the field emission of the electron generating portion 31 is suppressed is set. In this state, both of the electron generating portion 31 of the emitter 3 and the edge portion 52 (in the case of FIG. 3, the small diameter portion 51) of the guard electrode 5 are separate from each other (the emitter 3 is moved to the no-discharge position so as to be a discharge electric field or less). By properly applying a predetermined regeneration voltage between the guard electrode 5 and the grid electrode 8 (the lead terminal 82) and/or between the target 7 and the grid electrode 8 in this state shown in FIG. 2, discharge is repeated at the guard electrode 5 etc., then the guard electrode 5 etc. undergo the regeneration process (the surface of the guard electrode 5 melts or dissolves and is smoothed out).

After performing the regeneration process, by operating the emitter supporting unit 4 again, the emitter 3 is moved to the opening 22 side (to the discharge position) as shown in FIG. 1, and the state in which the field emission of the electron generating portion 31 is possible is set. In this state, the electron generating portion 31 of the emitter 3 and the edge portion 52 of the guard electrode 5 are positioned close to each other or contact each other, and the distance between the emitter 3 (the electron generating portion 31) and the guard electrode 5 (the edge portion 52) is shortest, then the dispersion of the electron beam L1 emitted from the emitter 3 is suppressed. Further, since the protrusion 60 and the crossing portion 61 of the movement restraining unit 6 cross and contact each other and the movement of the movable body 40 is restrained, the movement (toward the other end side) of the emitter supporting unit 4 is suppressed, and the movement of the emitter 3 is suppressed so that the emitter 3 does not move to the target side across the discharge position. Further, even in a case where the electron generating portion 31 and the edge portion 52 contact each other, a contact pressure can be lowered by the movement restraining unit 6.

By applying a predetermined voltage between the emitter 3 and the target 7 with the electron generating portion 31 of the emitter 3 and the guard electrode 5 being at the same potential in this state (the movement restrained state) shown in FIG. 1, electrons are generated from the electron generating portion 31 of the emitter 3 and the electron beam L1 is emitted, and the electron beam L1 collides with the target 7, then the X-ray L2 is emitted from the target 7.

By the regeneration process as described above, it is possible to suppress the flashover phenomenon (generation of the electrons) from the guard electrode 5 etc. in the X-ray apparatus 10, thereby stabilizing the quantity of generation of the electron of the X-ray apparatus 10. Further, the electron beam L1 can become a converging electron beam, and this easily brings the X-ray L2 to a focus, then high radioscopy resolution can be obtained.

Although the embodiments of the present invention have been explained in detail, the present invention can be modified within technical ideas of the present invention. Such modifications belong to scope of claims.

For instance, in a case where heat is generated due to collision of the electron beam with the target, the electric field radiation device of the present invention could be configured to cool the electric field radiation device using a cooling function. As the cooling function, various ways such as air cooling, water cooling and oil cooling are used. In the case of the cooling function using the oil cooling, for instance, the electric field radiation device is immersed or submerged in cooling oil in a certain case. Further, a degassing or deaerating operation (using a vacuum pump) could be properly carried out in the submerged state.

As a method of maintaining air tightness (high vacuum) of the vacuum chamber of the vacuum enclosure, each element or component (such as the insulator, the emitter unit, the target unit etc.) that forms the vacuum enclosure could be integrally brazed. However, as long as air tightness (high vacuum) of the vacuum chamber of the vacuum enclosure can be maintained, various ways can be used.

Although the vacuum pressure is exerted to the emitter supporting unit in the vacuum chamber, various shapes or forms can be employed as long as they can support the emitter movably in the both end directions of the vacuum chamber by properly operating them and the movement of the movable body is restrained by the movement restraining unit.

For instance, a configuration, in which an operator can feel a click when the emitter is moved to the predetermined position (the discharge position) by operation of the emitter supporting unit, could be used. With this configuration, it is possible to readily and quickly get the predetermined position when operating the emitter supporting unit. This contributes to, for instance, improvement in operability of emitter supporting unit.

Further, a fixing unit that properly fixes the emitter at the predetermined position could be employed. With this configuration, even if an unintentional external force (e.g. in the case of the configuration having the cooling function using the oil cooling, a suction force of the vacuum pump which may act on the supporting unit upon deaerating operation of the cooling oil) acts on the emitter or the emitter supporting unit, it is possible to prevent the emitter from shifting from the predetermined position. Therefore, the field emission in the electric field radiation device and the regeneration process for the guard electrode etc. can be properly realized. This fixing manner is not especially limited, but various shapes or forms can be employed. When explaining the fixing manner with the X-ray apparatus 10 taken as an example, a stopper such as screw that can suppress the shift of the emitter supporting unit 4 in the both end directions could be employed.

The invention claimed is:
1. An electric field radiation device comprising:
a vacuum enclosure formed by sealing both end sides of a tubular insulator and having a vacuum chamber at an inner wall side of the insulator;
an emitter positioned at one end side of the vacuum chamber and having an electron generating portion that faces to the other end side of the vacuum chamber;
a guard electrode arranged at an outer circumferential side of the electron generating portion of the emitter;
a target positioned at the other end side of the vacuum chamber and provided so as to face to the electron generating portion of the emitter;
a movable emitter supporting unit having a movable body that is movable in both end directions of the vacuum chamber and supporting the emitter movably in the both end directions of the vacuum chamber through the movable body; and
a movement restraining unit restraining a movement toward the other end side of the both ends directions of the movable body, and wherein
the emitter supporting unit is configured to change a distance between the electron generating portion of the emitter and the target by movement of the emitter supporting unit,
field emission is performed by the electron generating portion of the emitter with the movement of the mov- able body toward the other end side of the vacuum chamber being restrained by the movement restraining unit, the movement restraining unit has:
- a protrusion that protrudes from an outer circumferential side of the movable body outwards in a crossing direction of the vacuum chamber; and
- a crossing portion provided at a position of the other end side of the vacuum chamber with respect to the protrusion and crossing the protrusion in the both end directions, and the movement restraining unit is configured to restrain the movement of the movable body toward the other end side of the vacuum chamber by contact of the protrusion with the crossing portion.

2. The electric field radiation device as claimed in claim 1, wherein:
the guard electrode has a tubular shape that extends in the both end directions of the vacuum chamber, and one end of the guard electrode is retained by the vacuum enclosure, and
the crossing portion protrudes from a tubular inner circumferential side of the guard electrode inwards in the crossing direction of the vacuum chamber.

3. The electric field radiation device as claimed claim 1, wherein:
the movement restraining unit restrains the movement of the movable body toward the other end side of the vacuum chamber in a state in which a distance between a target side of the guard electrode and the electron generating portion of the emitter is shortest.

4. The electric field radiation device as claimed in claim 3, wherein:
the target side of the guard electrode contacts the electron generating portion of the emitter in the state in which the movement of the movable body toward the other end side of the vacuum chamber is restrained by the movement restraining unit.

5. The electric field radiation device as claimed in claim 3, wherein:
the guard electrode is provided, at the target side thereof, with a small diameter portion.

6. The electric field radiation device as claimed in claim 3, wherein:
the guard electrode is provided, at the target side thereof, with an edge portion that extends in the crossing direction of the vacuum chamber and overlaps with a circumferential edge portion of the electron generating portion of the emitter in the both end directions of the vacuum chamber.

7. The electric field radiation device as claimed in claim 1, further comprising:
bellows that can expand and contract in the both end directions of the vacuum chamber, and wherein
one end side of the bellows is retained by the emitter supporting unit, and the other end side of the bellows is retained by the vacuum enclosure.

8. The electric field radiation device as claimed in claim 1, wherein:
the movable body has a shape that extends in the both end directions of the vacuum chamber at an opposite side to the electron generating portion of the emitter.

9. The electric field radiation device as claimed in claim 1, wherein:
a grid electrode is provided between the emitter and the target in the vacuum chamber.

10. A regeneration processing method of the electric field radiation device as claimed in claim 1, comprising:
applying voltage across the guard electrode in a state in which the electron generating portion of the emitter and the guard electrode are separate from each other by operation of the emitter supporting unit; and
performing a regeneration process to at least the guard electrode in the vacuum chamber.

* * * * *